US009883678B2

(12) United States Patent
Mueller

(10) Patent No.: US 9,883,678 B2
(45) Date of Patent: Feb. 6, 2018

(54) COOKIE AND BAKED GOODS DECORATOR

(71) Applicant: Maryann Mueller, Altamont, NY (US)

(72) Inventor: Maryann Mueller, Altamont, NY (US)

( * ) Notice: Subject to any disclaimer, the term of this patent is extended or adjusted under 35 U.S.C. 154(b) by 0 days.

(21) Appl. No.: 14/878,543

(22) Filed: Oct. 8, 2015

(65) Prior Publication Data
US 2017/0099846 A1   Apr. 13, 2017

Related U.S. Application Data

(60) Provisional application No. 62/122,120, filed on Oct. 14, 2014.

(51) Int. Cl.
*A21C 15/00* (2006.01)
*A21D 13/00* (2017.01)

(52) U.S. Cl.
CPC ........ *A21C 15/005* (2013.01); *A21D 13/0009* (2013.01)

(58) Field of Classification Search
CPC ..... A21C 15/005; A21C 11/106; A21C 15/04; B26D 7/2614; B26D 5/10; B26F 1/46; B26F 1/32; B26F 1/40; B25G 3/08; B25G 3/18
USPC ..... 99/426–428, 430–433, 439; 30/299, 301, 30/305, 314–316, 342, 358; 206/223, 206/349, 575, 576
See application file for complete search history.

(56) References Cited

U.S. PATENT DOCUMENTS

| | | | | | |
|---|---|---|---|---|---|
| 2,214,475 | A | * | 9/1940 | Napolillo | A21C 11/106 30/316 |
| 2,379,140 | A | * | 6/1945 | Frank | B26B 3/00 30/130 |
| 2,612,123 | A | * | 9/1952 | Nord | A21C 11/106 30/301 |
| 2,620,755 | A | * | 12/1952 | Lewis | A21C 9/068 30/316 |
| 2,876,714 | A | * | 3/1959 | Brown | A21C 11/106 30/316 |
| 3,128,724 | A | * | 4/1964 | Linder | A21B 3/13 220/529 |
| 4,345,516 | A | * | 8/1982 | Sinclair | A47J 37/108 249/115 |
| 4,789,555 | A | * | 12/1988 | Judd | A21C 5/00 30/301 |
| 4,836,396 | A | * | 6/1989 | Ancona | A21C 11/106 206/457 |
| 4,988,321 | A | * | 1/1991 | Goldfarb | A63H 33/001 434/159 |
| 5,088,598 | A | * | 2/1992 | Iguchi | G09B 25/00 206/223 |
| 5,139,453 | A | * | 8/1992 | Aiken | A63F 7/0668 434/259 |

(Continued)

*Primary Examiner* — Eric Stapleton

(57) ABSTRACT

Embodiments of the invention include a simplistic cookie decorator comprised of two parts as a whole and the ability to add additional inserts for 3D level decorating. A receptor (part one) houses all the decorations and is compartmentalized by how the colors and decorations will flow through to the overlay (part two). The overlay engulfs the circumference of the cookie for stability and precision decorating. Decorations flow from the receptor down through the funnel-like holes into the moistened cookie and form the intended decoration. With the turn of the wrist, the cookie is decorated in its entirety, thus eliminating the need for hand decorating.

8 Claims, 5 Drawing Sheets

(56) References Cited

U.S. PATENT DOCUMENTS

| | | | | | |
|---|---|---|---|---|---|
| 5,303,473 | A | * | 4/1994 | Sadler | A21C 11/106 30/128 |
| 5,662,010 | A | * | 9/1997 | Barnett | B21D 37/205 30/315 |
| 5,774,918 | A | * | 7/1998 | Cassell | A21C 9/00 7/111 |
| 5,864,909 | A | * | 2/1999 | Liu | B26F 1/44 30/315 |
| 5,921,153 | A | * | 7/1999 | Barnett | B21D 37/205 30/315 |
| 5,954,561 | A | * | 9/1999 | Cannone | A63H 33/001 434/127 |
| 6,381,852 | B1 | * | 5/2002 | Wallays | A21C 15/04 294/99.2 |
| 6,851,192 | B2 | * | 2/2005 | So | A21C 11/106 30/299 |
| D583,633 | S | * | 12/2008 | Vendl | B26D 5/10 D7/675 |
| 8,230,604 | B1 | * | 7/2012 | Corey | B26D 7/2614 30/301 |
| 2002/0083597 | A1 | * | 7/2002 | Garner | B26D 5/10 30/316 |
| 2003/0180427 | A1 | * | 9/2003 | Morito | A21B 3/13 426/549 |
| 2004/0142063 | A1 | * | 7/2004 | Kolz | A21C 3/021 425/298 |
| 2005/0132579 | A1 | * | 6/2005 | Sartori | A21C 11/106 30/299 |

\* cited by examiner

US 9,883,678 B2

COOKIE AND BAKED GOODS DECORATOR

CROSS-REFERENCE TO RELATED APPLICATIONS

The present patent document claims priority to U.S. provisional patent application Ser. No. 62/122,120, filed Oct. 14, 2014 and entitled "MY PERFECT COOKIE", the contents of which are incorporated herein by reference.

BACKGROUND OF INVENTION

Field (Technical)

In the field of cookie decorating, such as decorating cookies for the holidays, birthdays, baby showers and the like, methods that are being utilized are dated and extremely labor intense. The high cost of purchasing these beautifully adorned cookies from your local bakery are due to the labor and not the ingredients utilized. When one cannot afford the luxury of purchasing these beautifully decorated cookies from a bakery, their alternative is to bake them at home. There is a tremendous amount of time and effort that goes into to accomplishing that goal and in today's world most cannot afford the luxury or loss of that time. Decorating cookies by hand not only requires intense labor but leaves one with a huge mess to clean up that is equally time-consuming. After all is said and done, these cookies will not be decorated with precision.

The current market offers many decorating tools, such as piping bags, various tips, fondants, decorated sugar paper and stamps that form shapes. However, these methods are all extremely time-consuming and only help the end-user in the process of building the decorated cookie. There is also automated machinery that works from a scanned photo and then duplicates it onto a cake, not something that the average consumer could afford nor even fit in their homes. There is nothing that provides a simplistic apparatus that decorates cookies in their entirety in seconds with precision by simply turning it over and allowing the decorations to flow onto a moistened cookie.

Working families are busier now than they have ever been, and that to-do list is getting longer utilizing time once allocated to our families. In a time with most families having both the mother and father working, shortcuts are needed and needed now. The days of piping bags, a huge mess to clean and wasted long hours hand decorating cookies are gone and are now being replaced by simplistic, accurate and quick ways to address their cookie decorating needs.

BRIEF SUMMARY OF INVENTION

In the field of decorating baked goods, such as decorating cookies for the holidays, birthdays, gifts and the like, current methods are extremely labor intense. This approach includes timely preparation, hours of decorating by hand and the daunting task of cleaning up. After all labor costs are factored in the end user winds up paying excessively high prices for these magnificent baked goods at their local bakery. Those who make the decision to undertake this project at home find that they cannot devote the many hours required to hand decorating these spectacular cookies. With working families busier now than they have ever been and that growing to-do list, shortcuts are in demand. A simplistic, precise, quick and cost effective way to address decorating their cookies and other baked goods is timely.

BRIEF DESCRIPTION OF SEVERAL VIEWS OF DRAWINGS

FIG. 1 depicts a drawing of the overlay, where:
Number 1 is an edge of the overlay—where it connects to the receptor,
Number 2 is a funnel-like hole forming the shape of the eye for the pumpkin,
Number 3 is a flat surface around the funnel-like hole that forms the eye of the pumpkin
Number 4 is a stem of the pumpkin,
Number 5 is a funnel-like hole forming the mouth of the pumpkin,
Number 6 is a flat surface around the funnel-like hole that forms the mouth of the pumpkin,
Number 7 is an opening in the overlay for easy access when pulling the cookie away from the imprint area,
Number 8 is an edge of the imprint area of the overlay,
Number 9 is an imprint area of the eye of the pumpkin,
Number 10 is an imprint area of the mouth of the pumpkin, and
Number 19 is an inside area of the stem.

FIG. 2 depicts drawing of the receptor, where:
Number 11 depicts the outside of the receptor face down,
Number 12 is the edge of the inside of the receptor that connects to the overlay,
Number 13 is the wall on the inside of the receptor where decorations are placed and keeps separated from other compartments that may or may not have different decorations, and
Number 14 is the flat surface of the receptor that lies underneath the decorations.

FIG. 3 depicts the insert that will be placed over the opening of the eye of the pumpkin and further define the outcome by adding a pupil, where:
Number 15 is an outside ledge of eye insert for the pumpkin,
Number 16 is an imprint opening in the insert that would meet the cookie and define the pupil of the eye for the pumpkin,
Number 17 is a side view of the insert for the pupil of the eye for the pumpkin, and
Number 18 is a wall of insert for pupil of the insert for the eye of the pumpkin.

DETAILED DESCRIPTION OF INVENTION

An embodiment of the invention is a cookie decorator comprised of two parts, a receptor, and an overlay with the option of adding smaller inserts that bring cookies to a 3D level. The utilization of this apparatus cuts the time devoted to decorating cookies and other baked goods by as much as 90%. The receptor (part one) is compartmentalized and houses all decorations. The overlay (part two) has funnel-like holes that when connected to the receptor guides the decorations down onto the moistened top of the cookie or other baked goods. The moistened cookie or baked goods are placed face down over the raised imprint area of the overlay. The overlay is then turned over with the cookie or baked goods snug in place for precision decorating. The raised area on the overlay forms the desired theme and decorates within seconds in its entirety with one turn of the wrist; it is then turned back over to accept any excess decorations.

Cookies should be baked inside food grade cookie cutters to ensure that the cookies do not spread during baking. This ensures that the overlay will fit around the circumference of the cookie perfectly for precision decorating. Baking companies that utilize machinery to form perfectly sized cookies will not need to bake inside cookie cutters.

Figure 1:
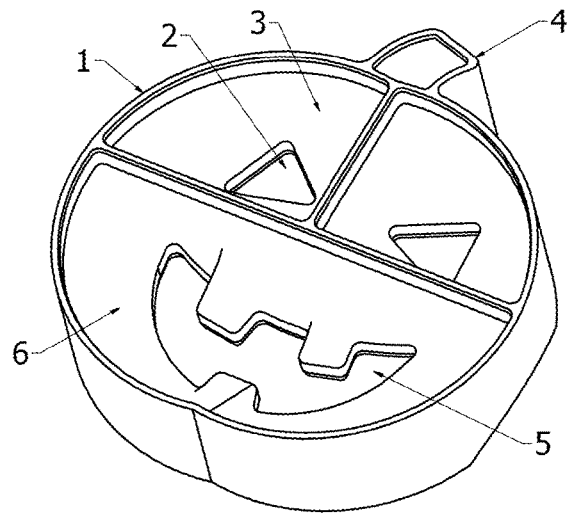
Figure 1:
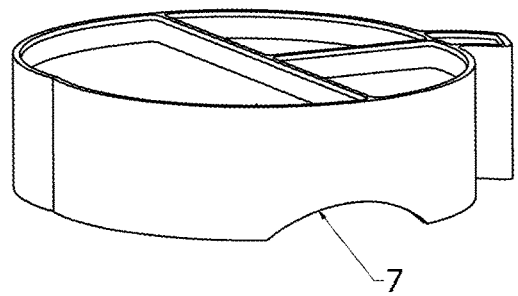
Figure 1:
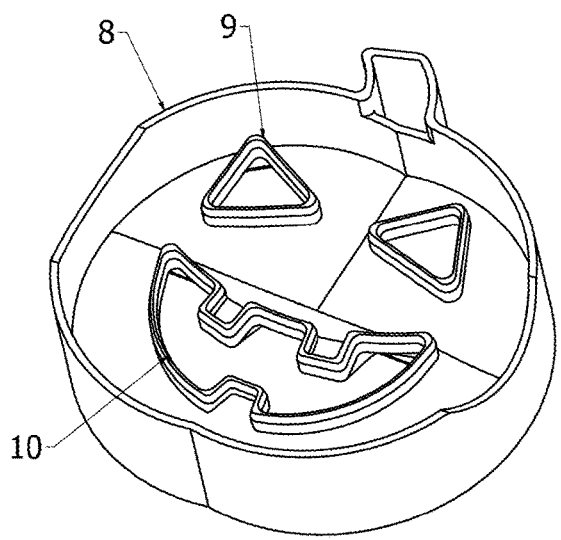
Figure 2:
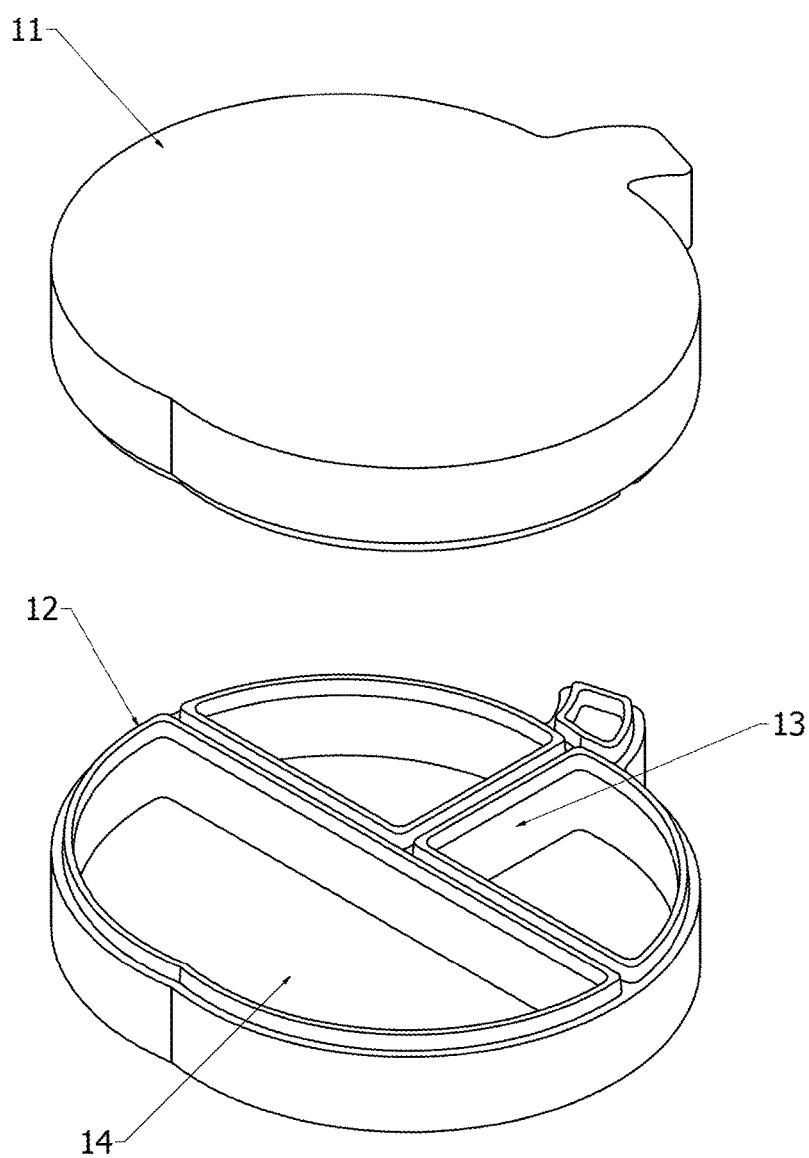

The preferred use of the invention is to place the receptor 2 on a flat surface with the 14 sectioned area facing up then fill with decorations of choice. Next, snap the overlay (FIG. 1) on top of the receptor (FIG. 2) with the imprint area facing up. After the two parts have been connected place a moistened or frosted cookie face down on the overlay (FIG. 1). Pick up the entire decorator with the cookie on top and turn it over to allow decorations to flow through from the receptor (FIG. 2) to the overlay (FIG. 1) and onto the cookie. Next, turn it back over and remove the cookie, this will allow the excess decorations to fall back into the receptor (FIG. 2) for the next cookie. Keep repeating this process until all cookies are decorated.

Figure 3:
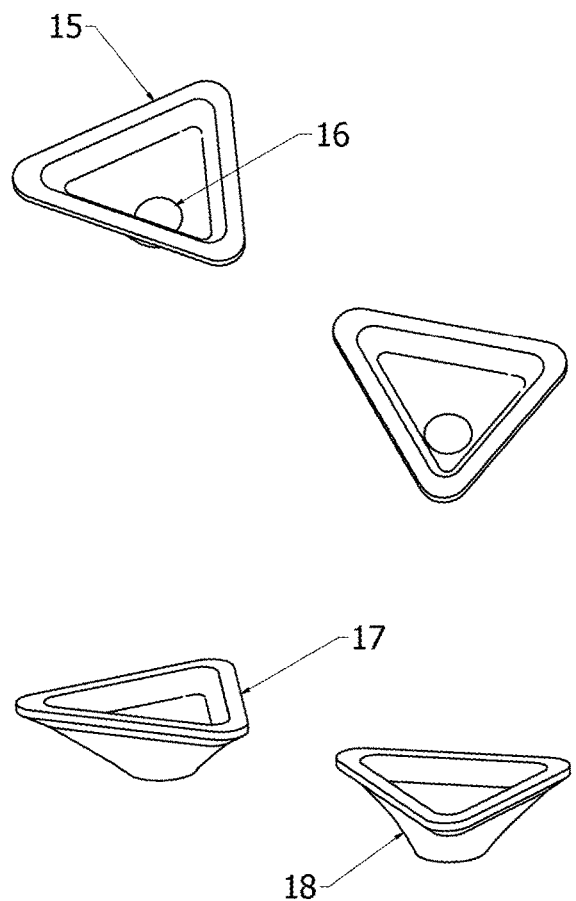
Figure 4A:
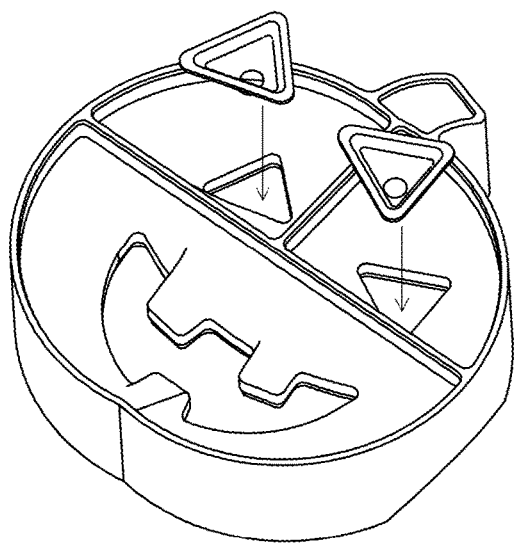
FIG. 4A depicts the inserts being placed over the eyes of the overlay that will further define the outcome by adding a pupil to the eye.
Figure 4B:
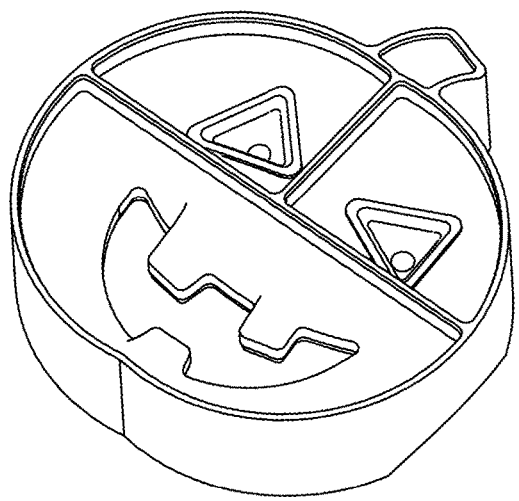
FIG. 4B depicts the inserts placed inside the opening of the eyes with a small open circle at the bottom that will define the pupil of the eye.
Figure 5:
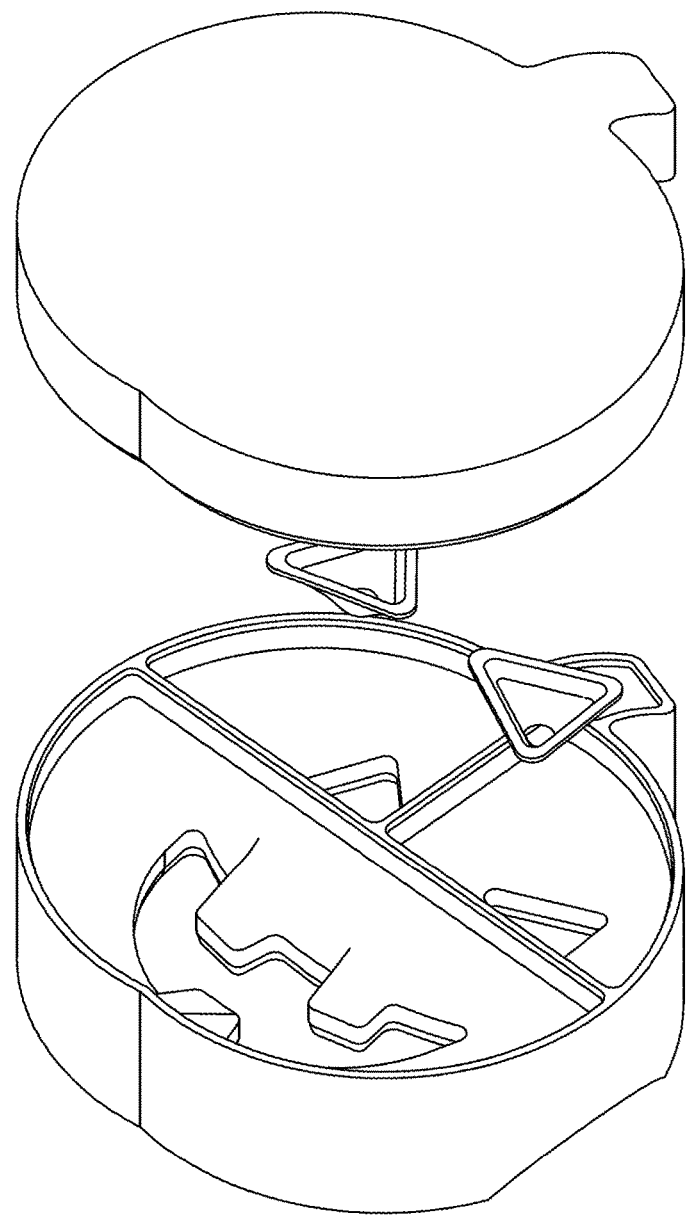
FIG. 5 depicts the three different components, when utilizing the insert the end-user would not need the receptor but would only require the overlay.

Additionally, cookies can be elevated to a 3-D level by inserting smaller inserts as depicted in FIG. 3 into the funnel-like holes to further enhance the outcome, as depicted in FIG. 4a-4b. This step can be achieved by laying the cookie on a flat surface then placing the cookie decorator over the cookie without pressing down. Place the smaller insert inside the intended funnel-like opening and brushing the area with additional frosting then the decorations to complete. The end user has now raised their cookie decorating skills to a 3D level.

Larger baked goods that are either too big or too heavy will only require the overlay to obtain precision decorating. The overly will guide the hand, and while it will cut the time, it will not result in the same decorating speed.

The invention claimed is:
1. An apparatus for decorating a food item with an edible decoration, the apparatus comprising:
   a compartmentalized receptor having a base and an outline to the shape of the food item;
   plurality of compartments protruding from the base of the compartmentalized receptor, wherein each of the compartment having a closed bottom, sidewalls extending from the closed bottom and an open top, further wherein the compartmentalized receptor stores the edible decoration;
   an overlay configured to detachably attached on top of the compartmentalized receptor, further the overlay having plurality of holes, wherein each hole configured to align on top of the each open top of the compartment, further the overlay having an inner surface and an outer surface, wherein the inner surface facing the compartmentalized receptor and the outer surface to receive the food item;
wherein the compartmentalized receptor, the overlay and the food item are flipped over to allow flow through of the edible decoration from each compartment through each hole onto the food item.

2. The apparatus according to claim 1, wherein the overlay further comprising a removable insert, the removable insert being placed inside the at least one hole of the overlay and the removable insert having at least one hole.

3. The apparatus according to claim 2, the removable insert providing a second set of decorations to the food item.

4. The apparatus according to claim 3, wherein the second set of decorations are transferred to the food item when the attached compartmentalized receptor and the overlay comprising the food item are flipped over in the case that the second set of decorations are placed in the at least one compartment of the compartmentalized receptor.

5. The apparatus according to claim 1, the overlay being further configured to receive a food item in the case that the food item is prepared inside a form to maintain a shape of the food item.

6. The apparatus according to claim 1, wherein the overlay is configured attachable to the compartmentalized receptor, and in the case that the at least one compartment of the compartmentalized receptor comprises the set of decorations, at least some of the set of decorations being transferred to the food item through the at least one hole in a shape of the at least one hole when the attached compartmentalized receptor and overlay comprising the inserted food item are flipped over.

7. The apparatus according to claim 6, wherein the compartmentalized receptor receiving a remaining set of decorations in the case that the attached compartmentalized receptor and overlay comprising the inserted food item are flipped back over.

8. The apparatus according to claim 1, wherein the overlay further comprising a side opening for removal of the food item.

* * * * *